United States Patent [19]

Mugglestone et al.

[11] Patent Number: 4,815,862
[45] Date of Patent: Mar. 28, 1989

[54] SELF-CONTAINED LINEAR BEARING UNIT AND LINEAR BEARINGS EMBODYING SUCH UNITS

[75] Inventors: Peter R. Mugglestone, Northport; Alfred M. Rogers, Deer Park, both of N.Y.

[73] Assignee: Thomson Industries, Inc., Port Washington, N.Y.

[21] Appl. No.: 132,065

[22] Filed: Dec. 10, 1987

[51] Int. Cl.[4] ............................................. F16C 29/06
[52] U.S. Cl. ........................................ 384/43; 384/45
[58] Field of Search ..................... 384/43, 44, 45, 49; 464/168

[56] References Cited

U.S. PATENT DOCUMENTS

| | | | |
|---|---|---|---|
| 2,628,135 | 2/1953 | Magee | 384/43 |
| 3,751,121 | 8/1973 | Geffner . | |
| 3,767,276 | 10/1973 | Henn | 384/43 |
| 3,951,473 | 4/1976 | Olschewski et al. . | |
| 4,025,128 | 5/1977 | Geffner . | |
| 4,204,717 | 5/1980 | Ernst et al. . | |
| 4,406,502 | 9/1983 | Teramachi . | |
| 4,456,312 | 6/1984 | Rogers, III et al. . | |
| 4,557,530 | 12/1985 | Haase . | |
| 4,572,591 | 2/1986 | Walter et al. . | |

FOREIGN PATENT DOCUMENTS

675646  10/1964  Italy ..................................... 384/43

Primary Examiner—Stanley N. Gilreath
Assistant Examiner—Thomas R. Hannon
Attorney, Agent, or Firm—Dilworth & Barrese

[57] ABSTRACT

A self-contained linear bearing unit presenting a single line of bearing support therewith is comprised of a retainer having ball-loaded paths and ball-unloaded paths with turnaround paths being located in end sections of the retainer. Caps received on the end sections capture the ball bearings and a bearing plate is disposed over the balls in the ball-loaded path. The unit can be made in a linked together chain of such units and various bearing configurations can be formed from plural ones of such units arranged in a desired disposition.

17 Claims, 6 Drawing Sheets

SELF-CONTAINED LINEAR BEARING UNIT AND LINEAR BEARINGS EMBODYING SUCH UNITS

BACKGROUND OF THE INVENTION

This invention relates generally to antifriction bearings and more particularly to linear motion bearings wherein bearing support is provided to a straight-line or slidably moveable member requiring such support.

There are known in the prior art numerous constructions of linear motion bearings. Such bearings could for example, be of the type disclosed in U.S. PAT. No. 3,767,276 wherein an assembly of inner and outer sleeves retain balls between such sleeves in raceways formed in the sleeve structures to provide bearing support for a shaft slidably received in the assembly. This type of bearing can be relatively expensive to manufacture and its assembly presents special requirements particularly in regard to ball bearing insertion in the sleeve raceways.

Linear bearings are being used in more and more applications wherein relatively slidable members require bearing support, and since competitiveness in the bearing industry is keen, the art has continually sought constructions of linear bearings which are more easily and cheaply manufactured. Thus bearings which utilize segmental parts such as stamped metallic or molded thermoplastic parts have been developed, U.S. PAT. Nos. 3,751,121, 3,951,473, 4,025,128, 4,456,312 and 4,572,591 being illustrative of these types of composite bearing assemblies. These constructions still present difficulties to the manufacturer, particularly in connection with the procedures attending assembly and especially with respect to holding the component parts in bearing array, such as inserting the balls in the raceways and inserting bearing plates in cooperation therewith until means such as a locking ring is fixed in place to hold the various components in final assembled condition. These difficulties are also present in regard to manufacture of bearing assemblies of a type in which a single cylindrical molded thermoplastic cage having plural races is employed in conjunction with an outer sleeve member. Special molding requirements are involved in making the cage member, principally as they relate to the complexity and cost of the dies required for molding the cage.

Although advantages can be gained from the use of certain recent linear bearing construction innovations, e.g., molded thermoplastic raceway segment parts, none of the proposals offered by the prior art provide a fully self-contained unit providing a single line of bearing support which is readily made of simply structured thermoplastic molded parts and easily assembled with ball bearings and bearing plate means so that the unit is capable of use, per se, or in combination with additional like units in a linear bearing configuration for providing bearing support.

The present invention provides a linear motion bearing which can be manufactured as a self-contained bearing unit containing all of the components required for providing a line of bearing support for a relatively slidable member or which can be used with one or more like units to establish a desired or required bearing configuration for such relatively slidable member. The unit is manufactured readily and inexpensively employing thermoplastic molding techniques. The assembling of the several components of the unit is effected very simply without the necessity of complicated tooling and/or fixtures and the units can be supplied as a chain of such wherein each unit is joined to another by integral tab connectors thereby facilitating and simplifying the handling of the units both in assembly operations and installation in bearing support environment.

SUMMARY OF THE INVENTION

The present invention relates to a wholly self-contained linear bearing unit which is capable of providing a single line of bearing support for a member relatively slidably moveable therewith. Generally, the unit will be used with additional like units to establish at least a partly encircling embrace or girding of at least part of the relatively slidably moveable member and in manner presenting correspondingly additional lines of bearing support. It should be noted, however, that the unit could be used in and of itself in some applications, depending on loading requirements, as a sole bearing means, inasmuch as all of the components of which a bearing is constituted are present in the permanently sealed assembly of same as provided by the invention. The bearing units can, with like units, be disposed in an environment such as fixed pillow blocks which support a slidably mounted shaft. The units, in a bearing configuration thereof, could on the other hand be located on a sliding member such as a carriage which slides along one or more fixed shafts. The bearing configurations can be varied, e.g., for use in connection with shafts of circular, square or three-sided configuration, as well as others.

The invention provides further that the bearing units can be manufactured in a continuous chain form of such bearing units wherein each unit is chained or connected to another by tab connectors. This feature facilitates and makes more efficient the bearing manufacturing operation. of particular advantage in chain manufacture of the units is not only the convenience and simplicity with which bearing configurations can be made in a manufacturing operation, but the ease and simplicity with which on-site bearing installation and/or replacement can be carried out in the field.

In accordance with the invention, the bearing unit comprises an elongated, laterally expansive retainer, such retainer having a central body part and body end parts or sections which advantageously, though not essentially, can be made of reduced size relative to the central body part. The retainer has an endless course raceway formed therein in which is received a plurality of ball bearings. The balls upon movement of the relatively moveable member recirculate around the raceway, the raceway including straight line longitudinally directed ball-loaded and ball-unloaded paths. The two straight line paths are connected at corresponding ends by ball turnaround courses formed in the retainer end sections. The ball-loaded path opens at one face of the retainer to present the balls for bearing contact by the relatively moveable member. The ball-unloaded path is a groove open at the other face of the retainer and a capture lip extends along a margin to hold captive the balls as they move along said unloaded path. Capture of the balls in the ball-loaded path is maintained by the presence of an elongated bearing plate. The elongated bearing plate is received in a seat formed in the retainer, the bearing plate extending beyond the central body part and partly into the respective two retainer end sections and being provided for the purpose of accepting transfer thereto of the loading imposed on the balls in the ball-loaded path by the relatively moveable member. Cap members are received on the end sections of the retainer. The cap members, which are fixedly secured to the retainer, such as by sonic welding, function to hold the bearing plate captured thereon and also to maintain capture of the balls as they move around the ball turnaround paths. The retainer and cap members can be made so as to having transverse outer peripheries which describe identical envelope courses, so that the diverse structural characteristics present in the several components of the unit can be merged in assembly to provide a smooth regular overall bearing unit profile consistent with the utilization of the units in such numbers and dispositions as may be required to define various specific ones of bearing configurations.

In establishing a bearing configuration, e.g., a closed bearing configuration in a pillow block supporting a slidable shaft, a plurality of linear bearing units of the invention (such as, e.g., four units) can be disposed adjacent one with the others in a fully encircling course about the shaft, the units desirably, though not essentially, being chained together by the connector tabs except for the connector tabs at the ends of the chain which can be removed for convenience of completing the bearing configuration or incident the separation of these units from a chain of greater plurality of such. Locking rings or other suitable means can be employed at the axial ends of the bearing configuration to secure the same in place in the pillow block. In an open type bearing configuration, such as one associated with support of a carriage slidable along one or more fixed shafts, the plurality of bearing units could, by way of example, be three such units with a shaft embracing expanse of 270 degrees.

The bearing plate receptive seat defining means in the retainer can include a pair of upstanding ribs on the retainer body extending therealong adjacent the margins of the ball-loaded path. The cap members, can be provided with internally configured surfaces complemental with external surfaces formed on the retainer end sections. These surfaces provide for effecting proper registering reception of the cap members on the retainer.

The advantages and further features of the invention will be made more apparent from the following detailed description to be given hereinafter and will be described in terms of such features of construction, combination of elements and arrangement of parts as will be exemplified in the construction set forth and the scope of the invention will be indicated in the claims.

BRIEF DESCRIPTION OF THE DRAWING

A fuller understanding of the nature and objects of the invention will be had from the following detailed description taken in conjunction with the accompanying drawing in which.

Throughout the following description, like reference numerals are used to denote like parts in the drawings.

DESCRIPTION OF THE PREFERRED EMBODIMENTS

Figure 1:
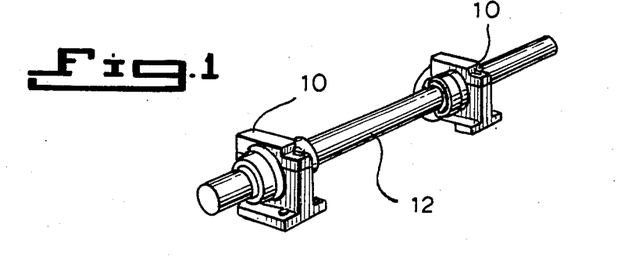
FIG. 1 is a perspective view depicting an illustrative environment wherein bearing units of the present invention can be employed, i.e., the bearing units are housed within pillow blocks for supporting a slidable shaft.
Figure 2:
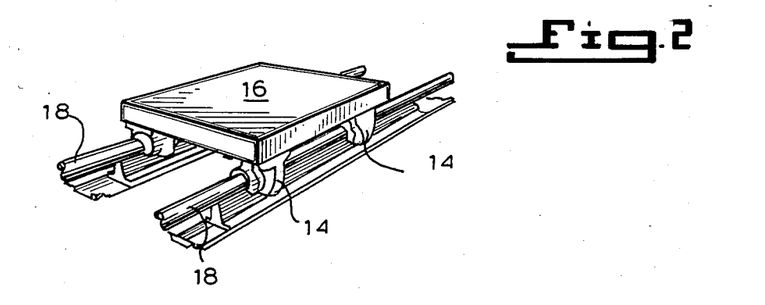
FIG. 2 is a perspective view depicting another environment for use of the bearing units of the invention wherein same are disposed in open pillow blocks carried on a carriage which moves slidably on a pair of fixed support shafts.

The linear bearing unit of the invention is a complete bearing unit, self-contained in all respects to function for providing a bearing line of support to a relatively slidably moveable member. It will, however, in most applications, be used in combination with additional like units arranged in a specific array of such units to provide plural lines of support for the movable member and in accordance with particular requirements for such support as related to the type of moveable member, loading associated with the sliding movement etc. It will be understood then, that the bearing unit of the present invention which is easily and most economically manufactured, will be adapted to use in a wide range of bearing applications, inclusive of ones where complete bearing installation is effected in the manufacturing facility, field installation of a bearing or field in-situ replacement of a prior installed bearing. Thus, the depicted environments of bearing utilization shown in FIG. 1 (pillow blocks 10 for sliding shaft 12) and FIG. 2 (open pillow blocks 14 carried on a carriage 16 slidable along fixed shafts 18), are illustrative of only two of the many bearing requirement applications those skilled in the art will understand can be satisfied with the bearing unit of the present invention.

Figure 11:
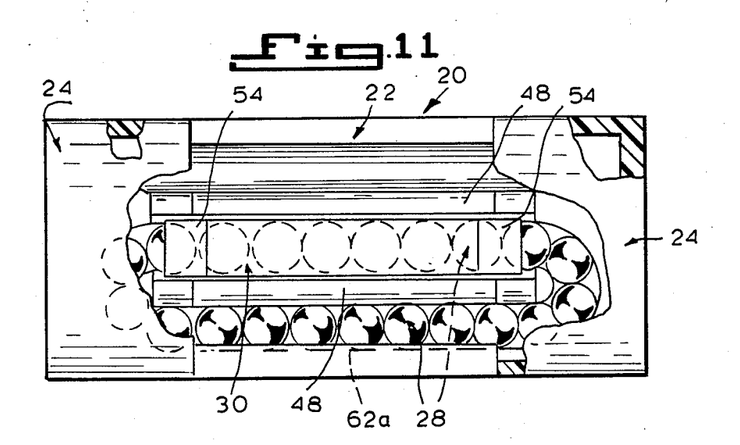
FIG. 11 is a top plan view of the assembled bearing unit showing cap members received on both ends of the retainer over the end sections thereof with portions being broken away for purposes of clarity of depiction in showing the bearing plate seating in the retainer and the disposition of the ball bearings in the unit.
Figure 12:
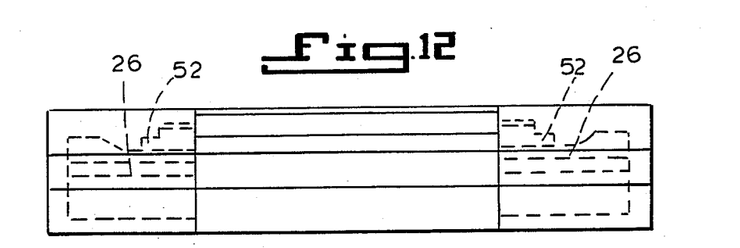
FIG. 12 is a side elevational view of the assembled bearing unit shown in FIG. 9 with the outline of the enclosed retainer end sections being shown in dashed lines, the ball bearings and bearing plate not being shown.

With reference first to FIGS. 11 and 12 which illustrate the features and construction character of a fully assembled linear bearing unit 20, the unit includes as the main elements thereof a retainer 22, end caps 24 received over reduced size end sections 26 of the retainer, a plurality of ball bearings 28 disposed in an endless course raceway formed in the retainer and a bearing plate 30 seated in the retainer over the ball-loaded path of the raceway, the bearing plate having, a length as seen in FIG. 11, that results in terminal end portions thereof being extended into the retainer end sections. It will be understood also that the bearing plate and the ball bearings are not illustrated in FIG. 12. The embodiment of bearing unit 20, it will be noted, has a generally arcuate transverse profile (as will be understood from further following description) indicating its utilization for bearing support in conjunction with cylindrically shaped relatively moveable members. Other embodiments of the unit will be described which contemplate the use thereof with otherwise configured moveable members and the unit transverse profile will be different to accommodate such use.

The more specific constructional details of the components embodied in unit 20 will be described now and be fully understood with continuing reference to FIGS. 3-10. The retainer 22 (FIGS. 3-7) is an elongated laterally expansive component having a central body part 32 and two opposed end sections 26, which desirably but not essentially, can be of reduced size relative to that of the central body part. One broad, i.e., bottom face of the retainer (seen at 34 in FIGS. 5 and 6) is of arcuate shape and constitutes the relatively slidably moveable member confronting face of the unit. The other, or broad upper face of the retainer, is that seen by the viewer in FIG. 3 and is characterized by the several and varied structure formations discussed next.

Figure 3:
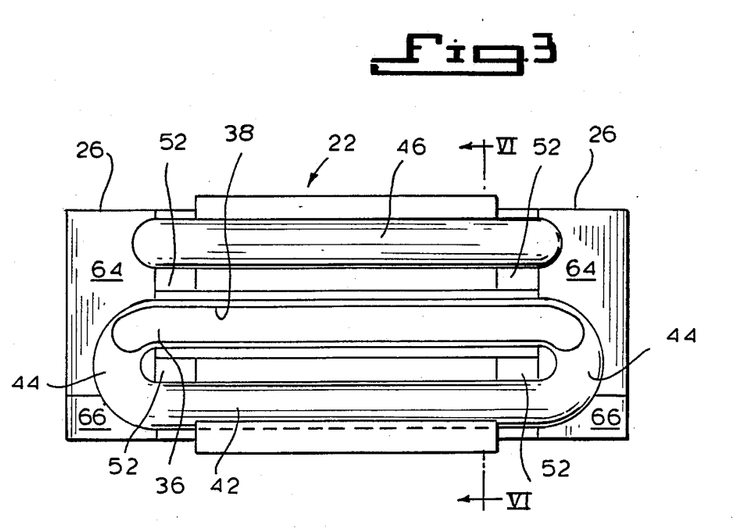
FIG. 3 is a plan view of the bearing unit retainer.
Figure 4:
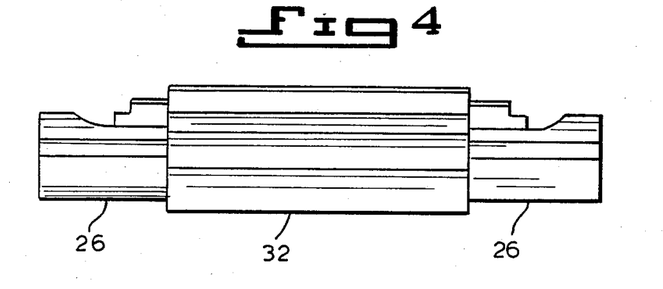
FIG. 4 is a side elevational view of the retainer.
Figure 7:
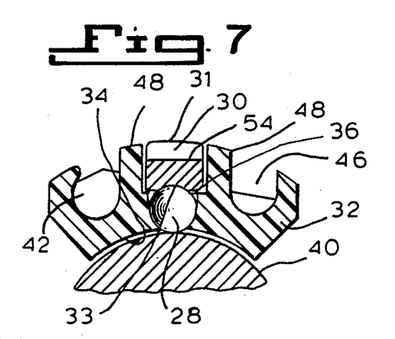
FIG. 7 is a view similar to FIG. 6 showing additionally the received position of the bearing plate in the retainer seat therefor and the manner in which the balls in the ball-loaded path engage the bearing plate, the connector tabs not being shown.

The endless course raceway formed as a groove in the retainer upper face includes a straight-line ball-loaded path 36 disposed longitudinally (preferably centrally longitudinally) of the retainer which path 36 is open to the bottom face 34 along slot 38 formed in the retainer so that the balls present in the ball-loaded path partly project through slot 38 for engagement with the moveable member 49 (FIG. 7). The raceway also includes the straight-line ball-unloaded path 42 laterally spaced from the ball-loaded path and positioned adjacent one side margin of the retainer, with these two paths at respective ends of each being joined by the turnaround paths 44 disposed in the retainer end sections. The turnaround paths can in one form of the retainer have the incline courses seen in FIG. 5 so that balls passing from the ball-loaded path to the ball-unloaded path ascend a slight distance and vice-versa. A blind molding relief groove 46 is disposed adjacent the other retainer side margin.

Extending upwardly on the retainer at the opposite sides of the ball-loaded path 36 are a pair of longitudinally directed ribs 48, the facing or confronting side walls of which have lower portions which merge with lateral shoulders 50 which constitute a seat for reception of bearing plate 30. The bearing plate 30 is elongated as seen in FIG. 11 and as can be noted from FIG. 7, the top surface 31 is of arcuate profile as is the bearing plate ball engaging groove 33. Groove 33 describes an arc having a slightly greatly radius of curvature than the balls 28. Terminal end portions of the ribs 48 and of the bearing plate 30 are stepped down, the ribs as at 52 and the bearing plate as at 54. The rib and bearing plate steps are provided so that the cap members 24 have clearance to assume abutting position against the retainer central body part when assembled therewith. The top surfaces of the ribs 48 (including the stepped parts 52) and that of the bearing plate (other than stepped parts 54) can be arcuately curved as best seen in FIG. 7.

Figure 5:
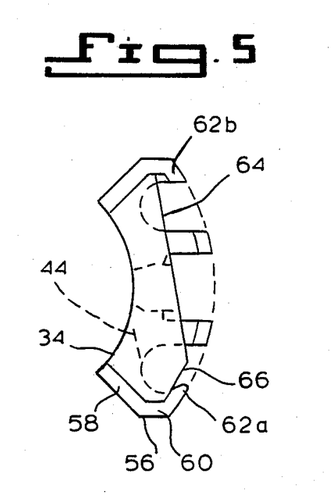
FIG. 5 is an end elevational view of the retainer, phantom lines being used to show the envelope course described by the transverse outer periphery of the retainer.
Figure 6:
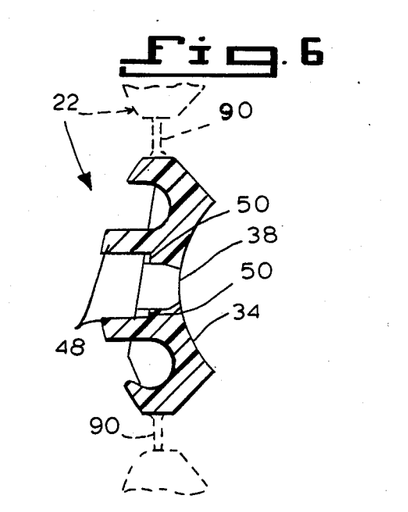
FIG. 6 is a transverse sectional view of the retainer as taken on the line VI—VI in FIG. 3 and showing in phantom depiction how the retainer can be connected with adjacent ones of such retainers by integral connector tabs.

The side margins of the retainer center body part 32 are wider than the margins of the end sections 26 by reason of the presence of skirt parts 56 which as best noted from FIG. 5 each include a lower straight section 58 (angulated divergently one relative to the other) and an upper straight section 60 (these being parallel one with the other). Each upper section 60 includes a laterally inwardly curving tip section, that tip section 62a adjacent the ball-unloaded path being slightly longer than the tip section 62b so that tip section 62a constitutes a capture lip partly laterally overlapping the ball-unloaded path defining groove for holding captive the balls as they move along the ball-unloaded path.

The retainer end sections 26 include at the top face two intersecting surfaces 64, 66, the larger one of such surfaces 64 being of substantial planar configuration inclining upwardly from one retainer margin toward the other where it intersects the surface 66 which last-mentioned surface is of upwardly convex arcuate sweep. Planar surface 64 is a mating surface for a complementally configured inner surface part of the caps 24 when same are received on the retainer end sections as shall be amplified further below.

Figure 8:
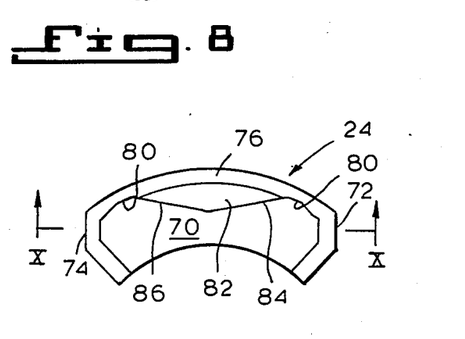
FIG. 8 is an end elevational view of the cap member which is received on each end of the retainer and as viewed from the open end thereof, i.e., the end which abuts with the retainer central body part.
Figure 9:
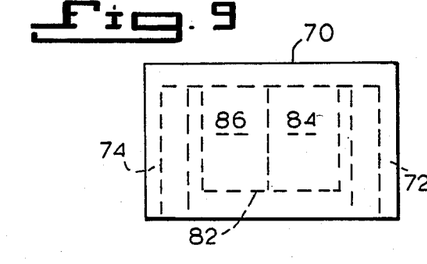
FIG. 9 is a top plan view of the cap member.
Figure 10:
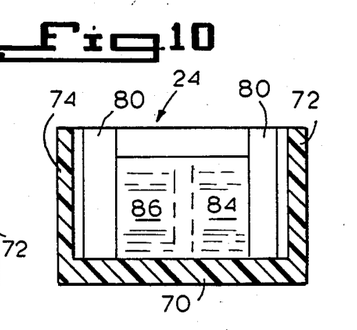
FIG. 10 is a sectional view of the cap member as taken on the line X—X in FIG. 8.

The cap 24 shown in FIGS. 8-10 is designed to be used interchangeably on either one of the reduced size end sections and when so received on the retainer serves to close off the end of the ball racecourse for captively holding the balls 28 in the turnaround paths and for capturing the bearing plate 30. The cap 24 has an end wall 70, side walls 72, 74 which have transverse identity with the retainer skirt parts 56, and an arcuate top wall 76 so that the bottom and other end of the cap are open. The undersurface of the top wall 76 as seen particularly in FIGS. 8 and 10, is provided with arcuate grooves 80 of relatively shallow depth and extending alongside a wedge 82 integral with and depending downwardly from the top wall 76, the wedge being defined by inward and downwardly coursing intersecting planar surfaces 84, 86, the said surfaces 84, 86 being those configured complementally to the retainer end section planar surface 64. The grooves 80 and the surfaces 84, 86 additionally provide clearance space for ball movement in the turnaround paths as the balls enter and leave the ball-unloaded path. When the caps are received on the retainer end sections, and depending on which end, one of the surfaces 84 or 86 therein will closely confrontingly juxtapose with the retainer end surfaces 64, the edges of the cap top wall and skirts thereof will abut with the retainer central body part and the free end surface of the retainer end sections will dispose closely adjacent the inner surface of the cap end wall 70. It will also be noted that the wedge 82 terminates short of the open end of the cap member which is sufficient to provide clearance for accommodation of the stepped down part of the bearing plate 30. Capture of the bearing plate is provided by the top wall 76 where it extends over the stepped down part between the end of the wedge and the inner transverse edge of the cap. With the caps in received position, the top wall 76 nests on top of the stepped down part 52 of retainer ribs 48 so that the envelope described by the transverse outer periphery of the cap (FIG. 8) is identical with that described by the transverse outer periphery of the retainer (as is best seen in FIGS. 5 and 7). These transverse envelope courses include the upper and lower courses which are arcs of a circle generated from a common center. The side surfaces extending between the upper and lower surfaces each include a lower straight portion which diverges relative to the other side lower portion and an upper straight portion which is angled with respect to the lower portion and in the direction of the other side surface. As seen in FIG. 8, these upper straight portions are disposed parallel one with the other. The unit, therefore, has a smooth overall profile with no protuberance therefrom except for the projection of the balls slightly outwardly from the underface of the unit through slot 38. It will also be understood that the bearing plate can project slightly beyond the envelope when load transfer therefrom to an adjacent structure is required.

Figure 15:
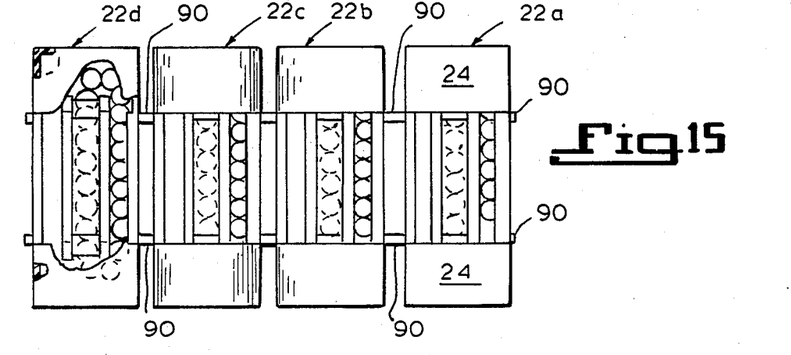
FIG. 15 is a plan view of a plurality of bearing units of the invention provided as a linked-together chain of such units in the fashion as the units leave the factory assembly operation and before same are installed in a bearing environment.

An important advantage of the bearing unit of the invention is, as noted earlier, the considerable convenience and simplicity by which it can be manufactured and used. The retainer 22 and cap members 24 preferably are made of thermoplastic material and the construction thereof allows molding of same with simplified, two-piece dies. With reference to FIGS. 7 and 15 it will be understood that the retainers 22 can be molded in a continuous chain form of plural retainers, each retainer being connected to ones adjacent thereto by means of integral relatively thin connector tabs 90, the tabs being located on the retainer skirts at the respective two junctures of the central body part 32 with the end sections 26. As a chain of retainers comes off the molding line, they can be horizontally oriented for placement of the ball bearings in the endless course raceways of each retainer and the bearing plates concurrently seated on top of the balls in the ball-loaded course. The end caps then can be received on the retainers and fixedly non-removably secured thereto by ultra-sonic welding or the like. The result is a completed assembly of the components in a wholly self-contained linear bearing unit without need for any special assembly devices and/or procedures. The completed chain, in convenient or desired plural numbers of units, then can be forwarded to particular in-plant bearing configuration assemling operations or a chain can be shipped to a user for in-field bearing installation and/or in situ replacement. An appreciation of the wide range of applications for which the bearing unit can be used will be discussed next.

Figure 13:
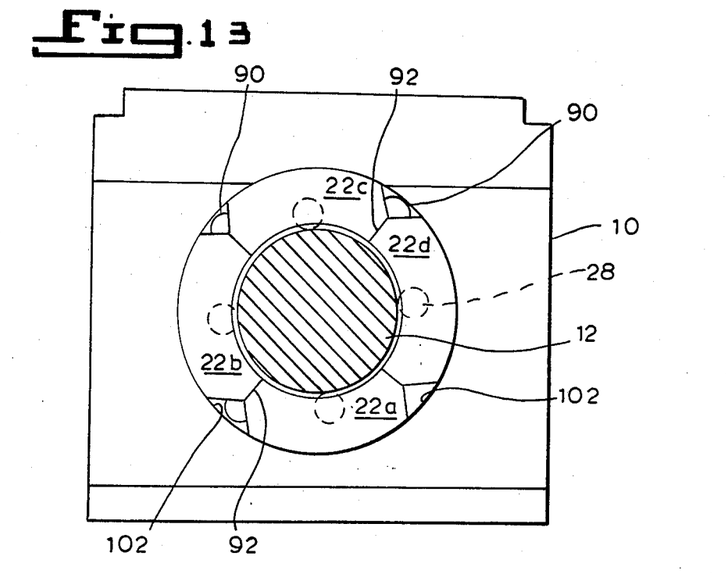
FIG. 13 is a fragmentary elevational view showing how bearing units of the present invention can be employed in the FIG. 1 environment.

FIG. 13 shows a pillow block 10 which is used for providing bearing support for slidable shaft 12, the pillow block being of conventional construction and cylindrically bored, as at 102, for reception of a bearing. The bearing in this instance can be provided by the bearing units 22a–d and the configuration of required linear bearing effected by utilizing a chained plurality of four units disposed longitudinally in the depicted encircling disposition about the shaft, wherein the lower straight section 58 of the side skirts of the retainers and identically configured cap side walls 72, 74 abut one with another as at 92 insuring correct alignment of the units one with the other in the required moveable member confrontation positioning. The tab connections 90 joining the units together can be left in place except that those associated with one side each of the units 22a and 22d have been removed in conjunction with removal of the four units from a larger chain of such units. It will be understood that retainers such as snap rings or the like (not shown) will be employed at opposite axial ends of the bearing units 22a–22d to securely hold the bearing units in place in the pillow block.

Figure 14:
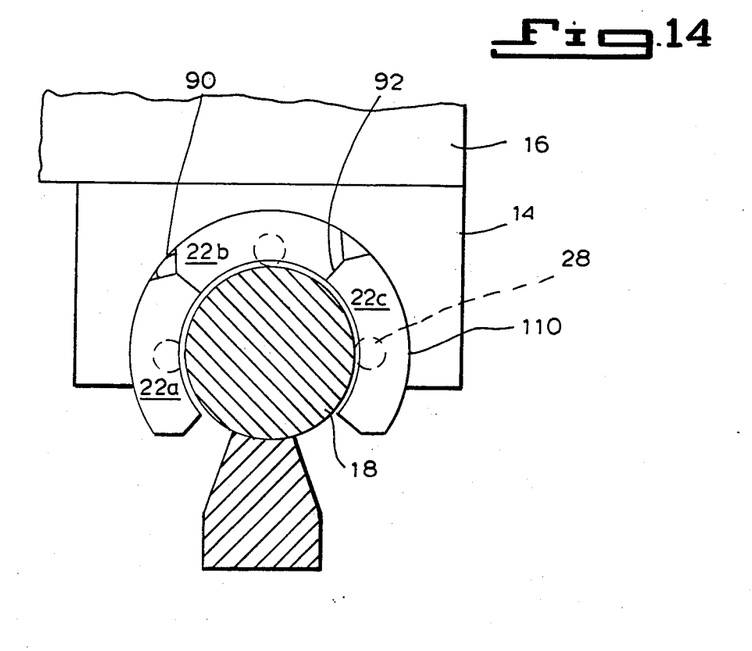
FIG. 14 is a fragmentary elevational view showing how bearing units of the present invention can be employed in the FIG. 2 environment.

Use of the bearing units of the invention in an open pillow block 14 environment and a bearing configuration for such use is shown in FIG. 14. That pillow block, e.g., can be attached to the slidable carriage 16 shown in FIG. 1 which is slidable along fixed shafts 18. The pillow block is bored as at 110 for reception of three bearing units 22a–22c which effect a 270 degree supporting embrace about shaft 18. Abutment of the units as at 92 and the presence of tabs 90 is the same as described before.

Figure 16:
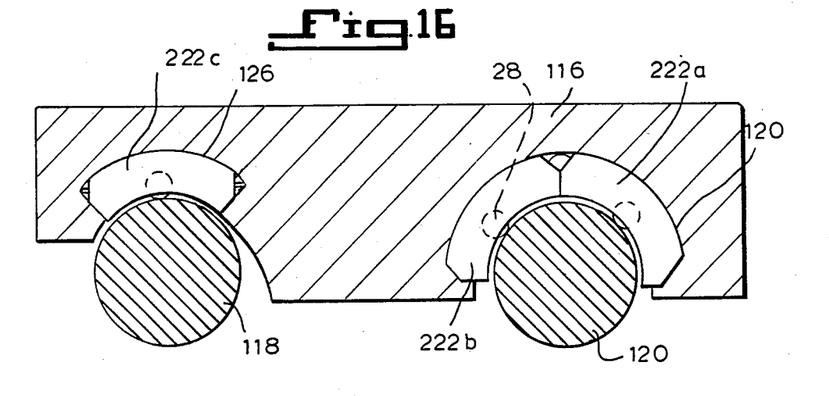
FIG. 16 is a fragmentary elevational view showing another manner of use of the bearing unit of the present invention.

Earlier in this description it was described that the bearing unit of the invention is capable of use in itself for bearing support providing a single line of such support. This of course will depend on the magnitude of loading imposed on the bearing. An example of this is shown in FIG. 16 and with reference to support for a sliding carriage 116 similar to that shown in FIG. 2 and riding on two fixed shafts 118, 120. The carriage can be bored as at 120 to receive a pair of chained together bearing units 222a and 222b and these units will assume the major vertical loading thrust acting on shaft 120. The single bearing unit 222c received in carriage bore 126 will be capable of assuming some of the vertical loading but will be employed principally to assume torsion or twisting loading of the carriage.

Figure 19:
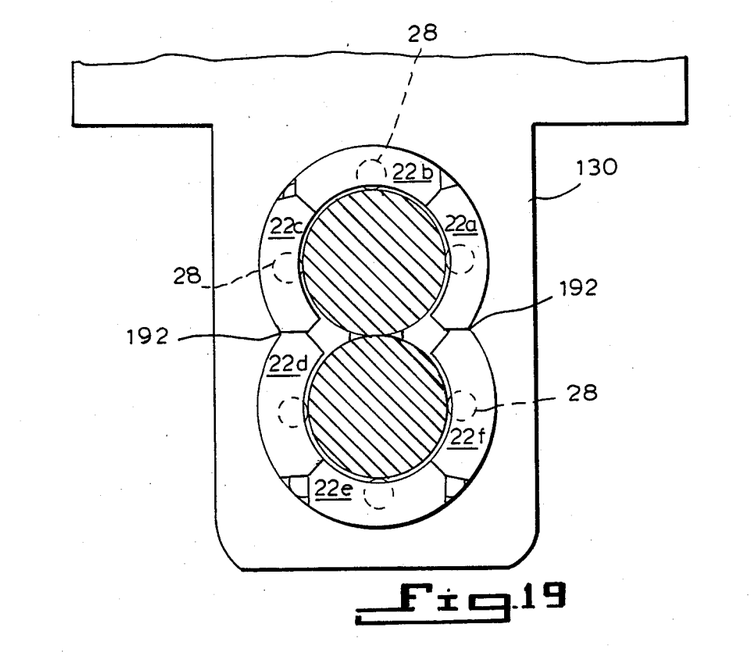
FIG. 19 is a fragmentary elevational view showing a further use of the bearing units with a double element support shaft.

FIG. 19 shows how a dual member support shaft consisting of two welded together vertically stacked shafts can be provided with a bearing configuration therearound and carried in a slidable housing 130. The bearing units 22a–22f are an arrangement of two opposed three unit chains, one chain embracing one shaft 270 degrees and the other chain the other shaft in like fashion with the ends of one unit chain abutting those of the other as at 192.

Figure 17:
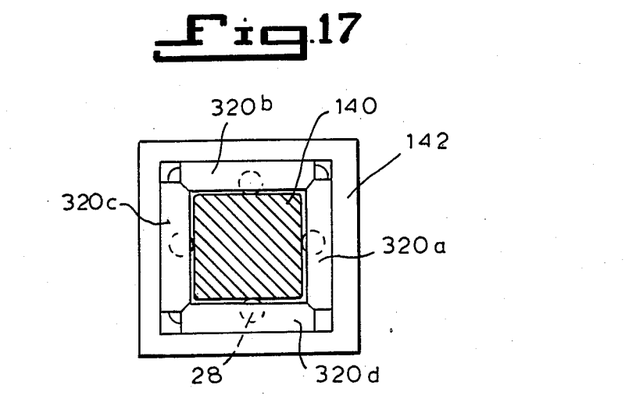
FIGS. 17 and 18 are fragmentary elevational views depicting the use of the bearing unit of the invention when providing bearing support for square and three-sided shafts.
Figure 18:
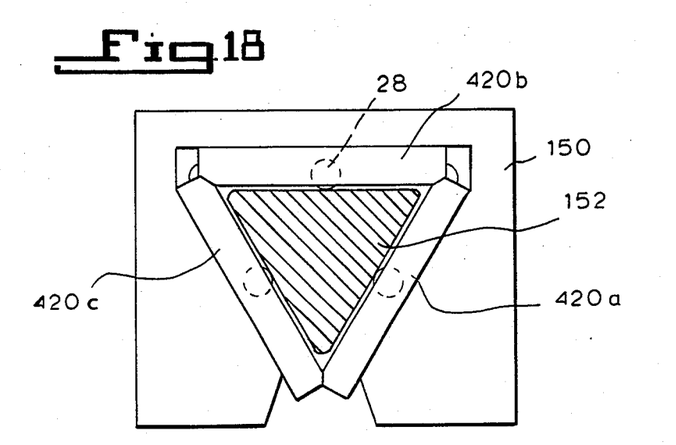

The embodiments of the unit of the present invention heretofore discussed are for use in respect of bearing support involving circular section relatively moveable members. The invention also provides that units can be provided for use with shafts of other configurations, such as square (FIG. 17) and three-sided (FIG. 18) shafts. In regard to a square shaft 140, four units 320a–320d can be received in a housing 142. The units in this instance have a different profile and can describe rectangular transverse periphery envelopes but they would otherwise be the same as the prior described units 20. The same applies to the units 420a–420c received in housing 150 for support of three-sided shaft 152, these variants of unit being molded and assembled in chain form as before described.

While there has been above disclosed only certain embodiments of the bearing unit of the invention, it will be appreciated by those skilled in the art that various modifications can be made thereto and still be within the scope of the inventive concept disclosed.

What is claimed is:

1. A wholly self-contained, permanently sealed assembly of components constituting an individual linear bearing unit adapted to provide a single line of bearing support for a member relatively slidably moveable therewith and such unit being adjacently positionable to and with additional like ones of such unit to provide correspondingly additional lines of bearing support for said member, said unit comprising the assembly components of an elongated laterally expansive retainer presenting opposite retainer faces one of which confronts the said member, said retainer having a central body part and opposed end sections, said retainer having an endless course raceway therein including ball turnaround paths disposed in the respective end sections and straight line longitudinally directed ball-unloaded and ball-loaded paths extending between corresponding ends of the turnaround paths, the ball-loaded path having an opening at the said one face of said retainer, the ball-unloaded path being defined by a groove open at the other face of said retainer, a plurality of balls received in said raceway and moveable around said endless course responsive to relatively slidable movement of said member in bearing contact with the balls in the ball-loaded path, an elongated bearing plate, said retainer including seat defining means receptive of said bearing plate in disposition thereof along the ball-loaded path and wherein the balls in the ball-loaded path can engage said bearing plate remote from the bearing contact of said balls with said member to thereby transfer bearing loading from the balls to said bearing plate, said bearing plate extending beyond the ends of said retainer central body part a distance into the retainer end sections, and cap means non-removably received on each of the end sections of said retainer for captively holding the balls in the ball turnaround paths as they transit same in moving to and from the ball-unloaded and ball-loaded paths and for captively holding said bearing plate in said seat, the retainer central body party carrying a capture lip extending along a margin of said ball-unloaded path defining groove to hold captive the balls as they move along said ball-unloaded path, the retainer and said cap means structures having transverse outer peripheries which describe identical envelope courses.

2. The self-contained linear bearing unit of claim 1 in which said retainer seat defining means includes a pair of ribs upstanding from the retainer adjacent the margins of said ball-loaded path.

3. The self-contained linear bearing unit of claim 2 in which lower portions of the confronting inner walls of said ribs merge with lateral shoulders upon which said bearing plate sits, the support plate for at least a major portion of its length having a thickness equal to or slightly greater than the upstanding reach of said ribs.

4. The self-contained linear bearing unit of claim 3 in which the ribs are longitudinally coextensive one with the other and the ends thereof extend beyond the ends of the retainer central body part into the retainer end sections.

5. The self-contained linear bearing unit of claim 4 in which the end sections of said retainer are of reduced size relative to the central body part and at least the end portions of said ribs and of said support plate where same extend into said retainer end sections are stepped down to provide clearance for reception of the cap means on the end sections of the retainer and in abutment with the central body part thereof.

6. The self-contained linear bearing unit of claim 5 in which the surface of the bearing plate engaged by the balls in the ball-loaded path is grooved along the length thereof.

7. The self-contained linear bearing unit of claim 6 in which the bearing plate groove is arcuate in section, the arc described by same having a slightly greater radius of curvature than the balls.

8. The self-contained linear bearing unit of claim 5 in which the retainer end sections at the other face of said retainer include at least two planar intersecting face surfaces, the cap means including at least one inner planar surface companion to one of said two intersecting face surfaces for abutment engagement therewith.

9. The self-contained linear bearing unit of claim 1 in which the ball-loaded path extends centrally longitudinally of said retainer and the ball-unloaded path is laterally spaced therefrom and adjacent a longitudinal margin of said retainer.

10. The self-contained linear bearing unit as set forth in claim 1 in combination with at least one additional like unit disposed longitudinally adjacent the first and having a side marginal surface thereof conformably abuttable with a side marginal surface of the first and when so abutted establishing a partly encircling embrace of the member relatively slidably moveable therewith presenting correspondingly additional line of bearing support therefor.

11. The linear bearing unit combination of claim 10 in which the side marginal surface of the unit includes at least two differently angled surface parts one of which abuts with a like surface part of an adjacent unit and the other surface part includes a connector tab integral therewith and with a like other surface part on the adjacently disposed unit.

12. The self-contained linear bearing unit as set forth in claim 1 in which the retainer and cap means structures have transverse outer peripheries which describe identical envelope courses, such described peripheries including upper and lower surfaces which are arcs of a circle generated from a common center and side surfaces extending between the ends of said upper and lower surfaces, said side surfaces each including a lower straight portion which diverges relative to the other and an upper straight portion which is angled with respect to the lower portion and in the direction of the other side surface.

13. The self-contained linear bearing unit of claim 12 in which the upper straight portion of the side surfaces are disposed parallel one with the other.

14. The self-contained linear bearing unit as set forth in claim 1 in which the retainer and cap means structures have transverse outer peripheries which describe identical envelope courses, such described peripheries including upper and lower surfaces uniformly spaced one from the other and side surfaces extending between the ends of said upper and lower surfaces, the side surfaces comprises at least two portions, one portion being angled with respect to the other.

15. The self-contained linear bearing unit as set forth in claim 14 in which the said upper and lower surfaces are parallel straight line surfaces.

16. The self-contained linear bearing unit as set forth in claim 1 in which the retainer and cap means are molded thermoplastic material components.

17. The self-contained linear bearing unit as set forth in claim 16 in combination with plural additional ones of such units as a chain of units, each unit in the chain being joined to a unit adjacent therewith by connector tabs integral with the sides of the retainer central body parts of each such unit and with the central body parts of the

* * * * *